(12) United States Patent
Wang et al.

(10) Patent No.: US 12,134,303 B2
(45) Date of Patent: Nov. 5, 2024

(54) TEMPERATURE CONTROL SYSTEM, TEMPERATURE CONTROL METHOD, AND VEHICLE

(71) Applicant: Huawei Digital Power Technologies Co., Ltd., Shenzhen (CN)

(72) Inventors: Jiangang Wang, Dongguan (CN); Shaobo Yang, Dongguan (CN); Jun Chen, Dongguan (CN); Quanming Li, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 155 days.

(21) Appl. No.: 17/953,487

(22) Filed: Sep. 27, 2022

(65) Prior Publication Data
US 2023/0014936 A1    Jan. 19, 2023

Related U.S. Application Data

(63) Continuation of application No. PCT/CN2020/082130, filed on Mar. 30, 2020.

(51) Int. Cl.
*B60H 1/32* (2006.01)
(52) U.S. Cl.
CPC ....... *B60H 1/32284* (2019.05); *B60H 1/3205* (2013.01)
(58) Field of Classification Search
CPC .. B60H 1/32284; B60H 1/3205; B60K 11/02; B60K 2002/003; Y02T 10/64
See application file for complete search history.

(56) References Cited

U.S. PATENT DOCUMENTS

| 2014/0034008 A1* | 2/2014 | Mehring | F02F 7/00 701/112 |
| 2014/0097261 A1* | 4/2014 | Blumenstock | B60H 1/22 165/41 |
| 2022/0126677 A1* | 4/2022 | Assaad | B60K 1/00 |

FOREIGN PATENT DOCUMENTS

| CN | 101513830 A | 8/2009 |
| CN | 104960411 A | 10/2015 |
| CN | 204956077 U | 1/2016 |
| CN | 106904070 A | 6/2017 |
| CN | 106524106 B | 8/2018 |
| CN | 108944395 A | 12/2018 |
| CN | 109318700 A | 2/2019 |
| CN | 208831157 U | 5/2019 |

(Continued)

*Primary Examiner* — Marc E Norman
(74) *Attorney, Agent, or Firm* — Maier & Maier, PLLC

(57) ABSTRACT

A temperature control system includes: a first cooling circuit, where a first cooling medium is circulated in the first cooling circuit, and the first cooling circuit is configured to cool a first structural unit; a second cooling circuit, where a second cooling medium is circulated in the second cooling circuit, and the second cooling circuit is configured to cool a second structural unit; and a heat exchanger, separately connected to the first cooling circuit and the second cooling circuit, and configured to perform heat exchange between the first cooling medium and the second cooling medium, where the first cooling circuit includes a bypass branch, and the bypass branch is connected in parallel to the heat exchanger. According to the temperature control system, heat dissipation efficiency for an inverter and an overall heat dissipation capability for a powertrain are improved.

16 Claims, 10 Drawing Sheets

(56) References Cited

FOREIGN PATENT DOCUMENTS

| | | | |
|---|---|---|---|
| CN | 110356195 | A | 10/2019 |
| DE | 102004016506 | B4 | 8/2013 |
| JP | 2013199853 | A | 10/2013 |

* cited by examiner

TEMPERATURE CONTROL SYSTEM, TEMPERATURE CONTROL METHOD, AND VEHICLE

CROSS-REFERENCE TO RELATED APPLICATIONS

This application is a continuation of International Application No. PCT/CN2020/082130, filed on Mar. 30, 2020, the disclosure of which is hereby incorporated by reference in its entirety.

TECHNICAL FIELD

The embodiments relate to the field of temperature control of an electric vehicle, a temperature control system, a temperature control method, and a vehicle.

BACKGROUND

A powertrain of an electric vehicle includes a motor, a direct current (DC)-alternating current (AC) inverter, a motor control system, and a speed reducer. When heat of the powertrain of the electric vehicle is to be dissipated, in a conventional technology, usually, heat of the motor and heat of the speed reducer are dissipated by using an oil-cooling circuit, heat of the inverter is dissipated by using a water-cooling circuit, and heat of the oil-cooling circuit is transmitted to the water-cooling circuit by using an oil-water heat exchanger. Currently, driven by the market, the powertrain is developing towards miniaturization. This means that a maximum rotation speed of the powertrain needs to be increased to output same power as that of an existing powertrain. Same power in a smaller volume means an increase in heat consumption density. How to efficiently dissipate heat from a system in a timely manner becomes a bottleneck that restricts miniaturization of the powertrain. Therefore, a heat dissipation technology is one of key technologies for miniaturization of the powertrain of the electric vehicle.

When a high current is applied to the inverter (that is, when low-speed peak torque is applied), a core of the inverter is at a risk of over-temperature. Therefore, a heat dissipation capability is usually improved by increasing fin density of a heat dissipation plate of the inverter or increasing cooling flow. When the motor rotates at a high speed, both magnetic steel and a coil are at a risk of over-temperature. Therefore, a heat dissipation capability is usually improved by increasing fin density of the oil-water heat exchanger or increasing a cooling flow rate.

Water-cooling circulation power (that is, the power of a water pump) in vehicle thermal management is rated. Therefore, if the fin density of the heat dissipation plate of the inverter and the fin density of the oil-water heat exchanger are increased, a heat dissipation capability of a radiator of the inverter and a heat dissipation capability of the oil-water heat exchanger can be improved, but in this solution, flow resistance of cooling water when circulating in the radiator of the inverter and the oil-water heat exchanger is significantly increased. Consequently, a coolant flow rate decreases at same output power of the water pump, and therefore, a heat dissipation capability of the powertrain cannot be increased at determined power of the water pump. In addition, if the fin density of the heat dissipation plate of the inverter is increased, hardware costs and process costs are also high. Moreover, if the fin density of the oil-water heat exchanger is increased, not only costs are increased, but a volume is also increased, and consequently, power-volume density of the powertrain is restricted.

Therefore, there is a need for a more effective and cost-effective temperature control solution for the electric vehicle.

SUMMARY

The embodiments may provide a more effective temperature control system used in an electric vehicle, to resolve a disadvantage in a conventional technology.

To achieve the foregoing objective, one aspect may provide a temperature control system, including: a first cooling circuit, where a first cooling medium is circulated in the first cooling circuit, and the first cooling circuit is configured to cool a first structural unit; a second cooling circuit, where a second cooling medium is circulated in the second cooling circuit, and the second cooling circuit is configured to cool a second structural unit; and a heat exchanger, separately connected to the first cooling circuit and the second cooling circuit, and configured to perform heat exchange between the first cooling medium and the second cooling medium, where the first cooling circuit includes a bypass branch, and the bypass branch is connected in parallel to the heat exchanger. The temperature control system is, for example, configured to dissipate heat for a powertrain of an electric vehicle, the first structural unit is, for example, an inverter in the electric vehicle, and the second structural unit is, for example, a motor and/or a motor speed reducer in the electric vehicle. The heat exchanger is, for example, an oil-water heat exchanger, and is configured to exchange heat with cooling oil (that is, the second cooling medium) in an oil-cooling circuit (that is, the second cooling circuit) by using cooling water (that is, the first cooling medium) in a water-cooling circuit (that is, the first cooling circuit), and the bypass branch is, for example, implemented as a bypass pipe. The heat exchanger is short-circuited by using the bypass pipe, so that the heat exchanger is entirely or partially short-circuited. In this way, flow resistance of the system is reduced, a flow rate in the water-cooling circuit is improved, and water flow (that is, an amount of fluid that flows through a closed pipe in unit time) in the water-cooling circuit is increased. Therefore, heat dissipation efficiency of the water-cooling circuit for the inverter is improved.

In an implementation, a valve is disposed in the first cooling circuit, and the valve is connected to the bypass branch and is configured to control flow distribution of the first cooling medium that flows to the heat exchanger and the bypass branch. A flow percentage in the bypass pipe is controlled by using the valve, so that the valve may be controlled based on a heat dissipation requirement of each component in the powertrain of the electric vehicle, to change flow resistance in the water-cooling circuit. In this way, heat dissipation of each component in the powertrain can be comprehensively considered, and a total heat dissipation capability of the temperature control system can be improved.

In an implementation, the first structural unit is an inverter in the electric vehicle, the valve is a controllable valve, and the valve is controlled to increase, in a process in which heat generation power of the inverter increases or when heat generation power of the inverter is to increase, a percentage of flow that is of the first cooling medium and that flows to the bypass branch. The valve is controlled to increase, in the process in which the heat generation power of the inverter increases or when the heat generation power of the inverter is to increase, a percentage of flow that is of water flow in the water-cooling circuit and that flows to the bypass pipe, so that the flow resistance in the water-cooling circuit is decreased to increase a flow rate in the entire water-cooling circuit. In this way, heat dissipation efficiency for the inverter is improved. In addition, when the flow in the water-cooling circuit increases, heat exchange for the oil-cooling circuit in the heat exchanger is reduced or stopped, and the motor may momentarily rely on a heat capacity of the motor to maintain a current operating status for a period of time. Therefore, although water flow that flows into the heat exchanger to exchange heat with the oil-cooling circuit is reduced by increasing the percentage of the water flow in the bypass pipe, the motor has a relatively low risk of over-temperature in a short period of time.

In an implementation, the valve is controlled to decrease, after the heat generation power of the inverter decreases, the percentage of the flow that is of the first cooling medium and that flows to the bypass branch. After the heat generation power of the inverter decreases, the risk of over-temperature of the inverter decreases. In addition, in some operating conditions, a rotation speed of the motor is relatively high, the heat generation power of the motor is relatively high, and there is a risk of over-temperature. Therefore, the valve is controlled to decrease a percentage of water flow in the bypass pipe, so that more water flows into the heat exchanger in unit time to exchange heat with the oil-cooling circuit. In this way, a heat exchange capability for the motor is improved, and over-temperature of the motor is avoided.

In an implementation, the valve is controlled to increase, when the electric vehicle is to reach a first predetermined operating condition, the percentage of the flow that is of the first cooling medium and that flows to the bypass branch to a first percentage. Operating conditions of the powertrain of the electric vehicle are classified into at least two operating conditions, so that a state of the valve can be controlled by determining whether an operating condition is reached. Before the first predetermined operating condition is reached, it indicates that the heat generation power of the inverter is to be greater than or equal to a predetermined value. Therefore, the state of the valve may be adjusted to increase a percentage of water flow that flows into the bypass pipe, to increase a water flow rate in the water-cooling circuit. In this way, heat dissipation efficiency for the inverter is improved.

In an implementation, the valve is controlled to increase, when the electric vehicle is to reach a second predetermined operating condition, the percentage of the flow that is of the first cooling medium and that flows to the bypass branch to a second percentage, where heat generation power that is of the inverter and that is corresponding to the first predetermined operating condition is greater than heat generation power that is of the inverter and that is corresponding to the second predetermined operating condition, and the first percentage is greater than the second percentage. In this implementation, operating conditions of the powertrain are classified into at least three operating conditions, and each operating condition corresponds to a different heat generation power interval of the inverter. Therefore, when the heat generation power that is of the inverter and that is corresponding to the first predetermined operating condition is greater than the heat generation power that is of the inverter and that is corresponding to the second predetermined operating condition, an opening degree of the valve may be correspondingly adjusted, so that the valve may be separately adaptively adjusted relative to a plurality of heat generation power intervals of the inverter. For an operating condition corresponding to an interval of relatively high heat generation power, the valve is adjusted to a state that can enable a percentage of water flow in the bypass pipe to be relatively large. For an operating condition corresponding to an interval of relatively low heat generation power, the valve is adjusted to a state that can enable the percentage of the water flow in the bypass pipe to be relatively small. In this way, adjustment of the valve is more precisely applicable to a change of the heat generation power of the inverter.

In an implementation, the valve is controlled to decrease, after the electric vehicle reaches a third predetermined operating condition, the percentage of the flow that is of the first cooling medium and that flows to the bypass branch to a third percentage.

In an implementation, the first predetermined operating condition, the second predetermined operating condition, and the third predetermined operating condition are separately determined based on any one or more of the following: torque of a motor, a rotation speed of the motor, power of the motor, heat generation power of the motor, a stator current of the motor, temperature of the inverter, heat generation power of the inverter, and temperature of the motor. Therefore, control over the valve may be determined in a plurality of measurement manners and by using corresponding hardware configurations. Therefore, the temperature control system may have a plurality of implementations.

In an implementation, the valve is a two-way valve or a three-way valve. Corresponding to different valves, the temperature control system also has different connections between pipelines. Alternatively, the temperature control system may not include the valve. Different configurations of the temperature control system may have different manufacturing costs and volumes. Therefore, different configurations may be selected based on a requirement of a vehicle model to implement the temperature control system.

Another aspect provides a temperature control method, and the method is performed based on the foregoing temperature control system and includes: determining a change that is to occur on heat generation power of an inverter; and when it is determined that heat generation power of the inverter is to increase, controlling a valve in a process in which the heat generation power of the inverter increases or before the heat generation power of the inverter increases, so that a percentage of flow that is of a first cooling medium and that flows to a bypass branch is increased.

In an implementation, the method further includes: when it is determined that the heat generation power of the inverter is to decrease, controlling the valve after the heat generation power of the inverter decreases, to decrease the percentage of the flow that is of the first cooling medium and that flows to the bypass branch.

In an implementation, the controlling a valve in a process in which the heat generation power of the inverter increases or before the heat generation power of the inverter increases, so that a percentage of flow that is of a first cooling medium and that flows to a bypass branch is increased includes: controlling the valve before an electric vehicle reaches a first predetermined operating condition, so that the percentage of the flow that is of the first cooling medium and that flows to the bypass branch is increased to a first percentage.

In an implementation, the controlling a valve in a process in which the heat generation power of the inverter increases or before the heat generation power of the inverter increases, so that a percentage of flow that is of a first cooling medium and that flows to a bypass branch is increased includes: controlling the valve before the electric vehicle reaches a second predetermined operating condition, so that the percentage of the flow that is of the first cooling medium and that flows to the bypass branch is increased to a second percentage, where heat generation power that is of the inverter and that is corresponding to the first predetermined operating condition is greater than heat generation power that is of the inverter and that is corresponding to the second predetermined operating condition, and the first percentage is greater than the second percentage.

In an implementation, the controlling the valve after the heat generation power of the inverter decreases, to decrease the percentage of the flow that is of the first cooling medium and that flows to the bypass branch includes: controlling the valve after the electric vehicle reaches a third predetermined operating condition, so that the percentage of the flow that is of the first cooling medium and that flows to the bypass branch is decreased to a third percentage.

Another aspect may provide a chip, the chip includes a processor and an interface circuit, the interface circuit is coupled to the processor, and the processor is configured to run a computer program or instructions, to implement the foregoing temperature control method.

Another aspect may provide a vehicle, and the vehicle includes any one of the foregoing temperature control systems, where the first structural unit is an inverter in the vehicle, and the second structural unit includes a motor in the vehicle.

According to the temperature control system, when the motor has a low rotation speed and large torque (a peak current), water-cooling circulation flow is increased by 1 to 2 times in a short term by bypassing (short-circuiting) a water path of the heat exchanger and by using a relatively large heat capacity of the motor, so that a short-term heat dissipation capability for the inverter is improved, and temperature of the inverter is decreased by more than 10° C. in a short period of time. An advantage of this method is: The short-term heat dissipation capability for the inverter is improved without using a complex and high-cost heat dissipation design.

BRIEF DESCRIPTION OF THE DRAWINGS

The embodiments are described with reference to the accompanying drawings.

DETAILED DESCRIPTION OF THE EMBODIMENTS

The following describes the embodiments with reference to the accompanying drawings.

Figure 1:
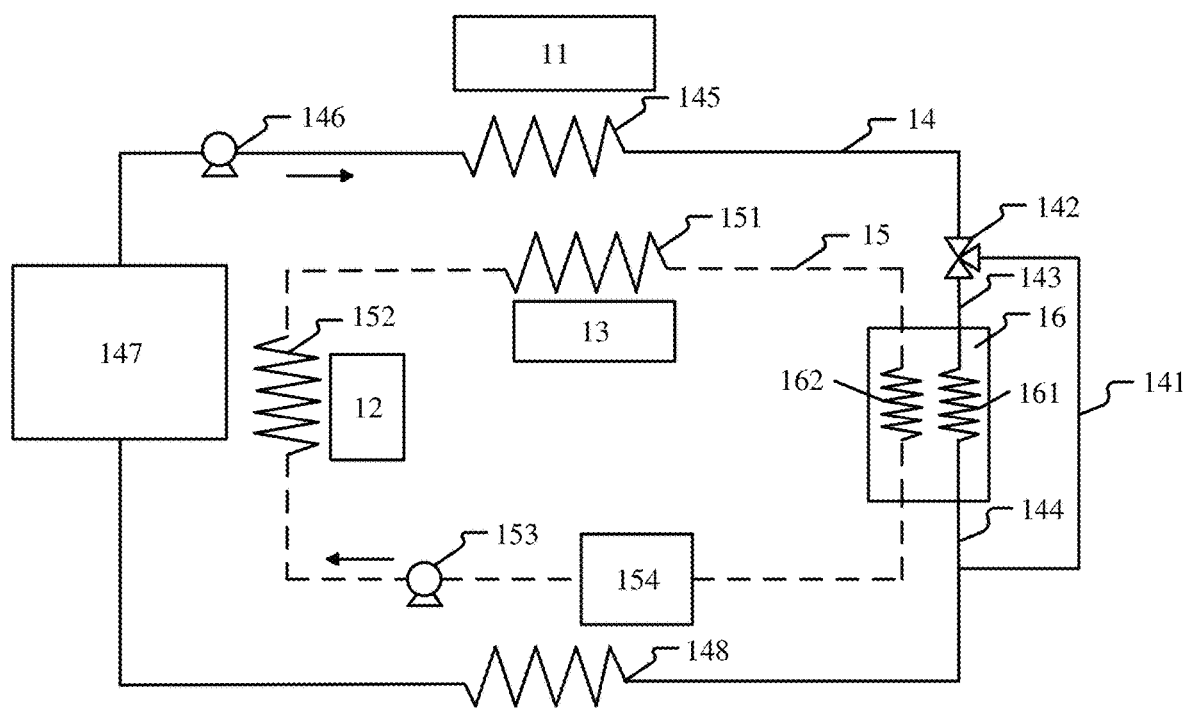
FIG. 1 is a schematic diagram of a temperature control system according to an embodiment.

FIG. 1 is a schematic diagram of a temperature control system according to an embodiment. The temperature control system is configured to dissipate heat for a powertrain of an electric vehicle. The powertrain of the electric vehicle includes an inverter 11, a motor 12, and a motor speed reducer 13 shown in FIG. 1. As shown in FIG. 1, a flow path of the temperature control system includes a water-cooling circuit 14, an oil-cooling circuit 15, and an oil-water heat exchanger 16. The water-cooling circuit 14 includes a bypass pipe 141, a valve 142, a water inlet pipe 143 and a water outlet pipe 144 that are connected to the oil-water heat exchanger 16, a radiator 145 configured to dissipate heat for the inverter 11, a water pump 146, a cooling water tank 147, and a radiator 148. The oil-cooling circuit 15 includes a radiator 151 configured to dissipate heat for the motor speed reducer 13, a radiator 152 configured to dissipate heat for the motor 12, an oil pump 153, and a cooling oil tank 154. The oil-water heat exchanger 16 includes a radiator 161 connected to the water-cooling circuit 14 and a radiator 162 connected to the oil-cooling circuit 15 and is configured to dissipate heat for liquid in the oil-cooling circuit 15 by using cooling water in the water-cooling circuit 14. The bypass pipe 141 is configured to be connected in parallel to the radiator 161 in the oil-water heat exchanger 16 by using the valve 142, so that flow distribution of water in the water-cooling circuit 14 that flows into the bypass pipe 141 and the radiator 161 can be controlled by using the valve 142, to optimize a heat dissipation capability of the temperature control system for the powertrain.

As shown in FIG. 1, in the water-cooling circuit 14, the cooling water tank 147 includes cooling water with relatively low water temperature, and the water pump 146 draws out the water in the cooling water tank, so that water flow flows into the radiator 145 in an arrow direction on a right side of the water pump 146, to dissipate heat for the inverter 11. After flowing through the radiator 145, the water flow in the water-cooling circuit 14 flows into the radiator 161 and/or the bypass pipe 141 under the control of the valve 142, and then flows into the radiator 148. The radiator 148 causes heat exchange between the water flow and air, so that temperature of heated water flow decreases. In this way, the water flow in the water-cooling circuit 14 flows back to the cooling water tank 147 at relatively low temperature after passing through the radiator 148.

In the oil-cooling circuit 15, the cooling oil tank 154 includes oil liquid with relatively low temperature. The oil pump 153 draws out the liquid in the cooling oil tank 154, so that the liquid flows into the radiator 152 in an arrow direction on a left side of the oil pump 153 to dissipate heat for the motor 12. Then, the liquid in the oil-cooling circuit 15 flows into the radiator 151, to dissipate heat for the motor speed reducer 13. After flowing through the radiator 152 and the radiator 151, the liquid in the oil-cooling circuit 15 flows into the radiator 162 in the heat exchanger 16, so that heat is exchanged, in the heat exchanger 16, with water flow in the radiator 161. In this way, temperature of heated oil decreases. Then, the liquid in the oil-cooling circuit 15 flows back to the cooling oil tank 154 at relatively low temperature after passing through the heat exchanger 16.

Figure 2:
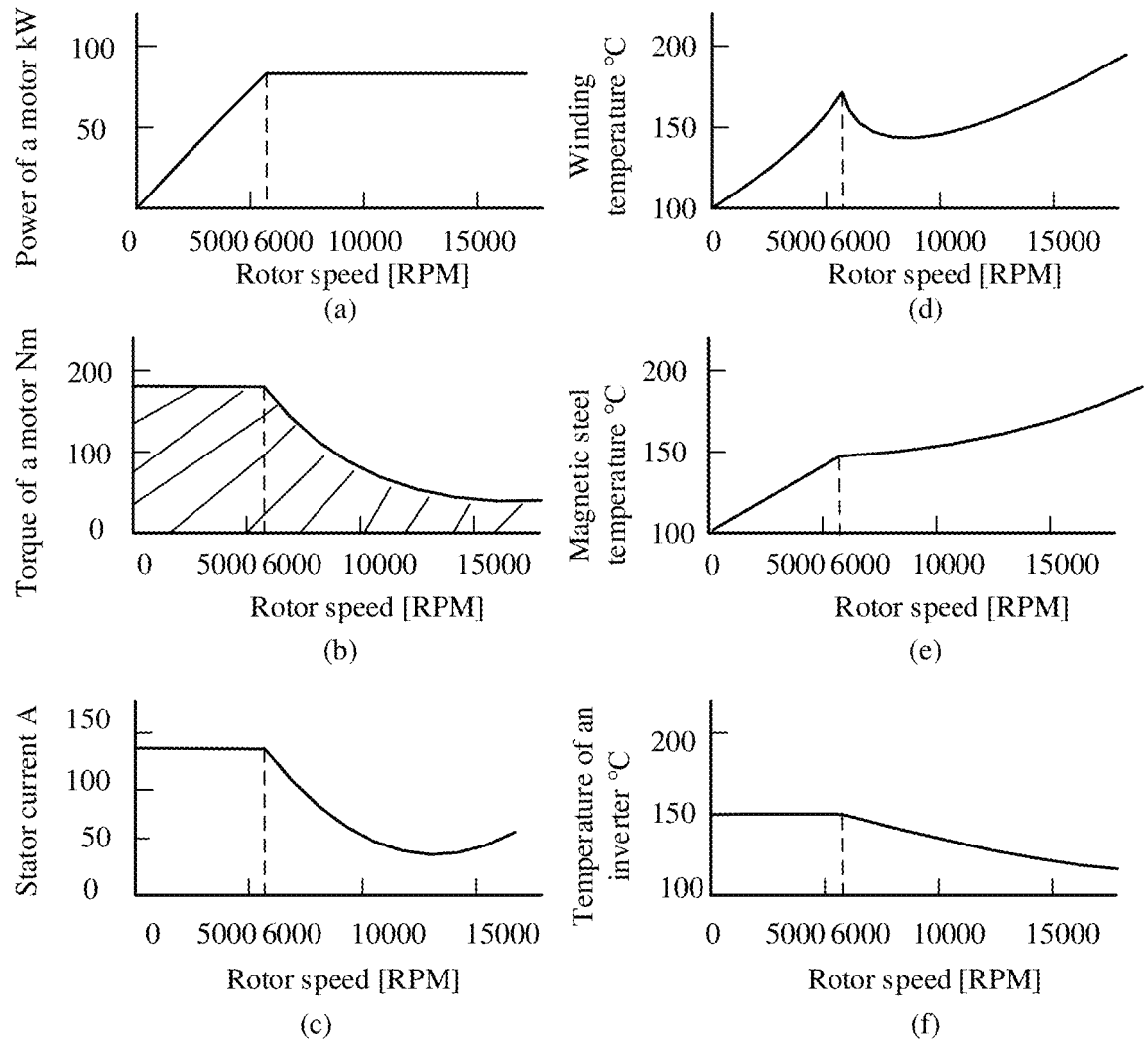
FIG. 2(a) to FIG. 2(f) are diagrams of curves of changes of working parameters in a powertrain of an electric vehicle relative to a rotation speed.

(a) in FIG. 2 to (f) in FIG. 2 are diagrams of curves of changes of working parameters in a powertrain of an electric vehicle relative to a rotation speed. As shown in (a) in FIG. 2, power of the motor increases as the rotation speed increases in an interval from 0 to 6000 revolutions per minute (RPM) and reaches a maximum value when a rotation speed is 6000 RPM. After the rotation speed increases to be greater than 6000 RPM, the power of the motor maintains a constant value. With reference to (b) in FIG. 2 and (c) in FIG. 2, a change of torque of the motor with the rotation speed is basically the same as a change of a stator current with the rotation speed, and both the change of the torque of the motor with the rotation speed and the change of the stator current with the rotation speed maintain constant maximum values when the rotation speed is between 0 to 6000 RPM and decrease after the rotation speed is greater than 6000 RPM. As shown in (d) in FIG. 2 and (e) in FIG. 2, winding temperature in (d) in FIG. 2 and magnetic steel temperature in (e) in FIG. 2 respectively correspond to temperature of a winding in the motor and temperature of magnetic steel in the motor, where a change trend of the winding temperature relative to the rotation speed and a change trend of the magnetic steel temperature relative to the rotation speed are basically: increasing as the rotation speed increases. In other words, a relatively high rotation speed leads to relatively high temperature in the motor and larger heat generation power. The heat generation power is heat generated per unit time. If heat generated by the motor is not dissipated in a timely manner, accumulation of heat leads to a temperature rise. As shown in (f) in FIG. 2, temperature of the inverter maintains maximum temperature in an interval from 0 to 6000 RPM of the rotation speed and begins to decrease after the rotation speed is greater than 6000 RPM. It can be understood with reference to (b) in FIG. 2, (c) in FIG. 2, and (f) in FIG. 2 that in a case of large torque, a large current, and a medium-low rotation speed, the temperature of the inverter is the highest; in other words, in this case, heat generation power of the inverter is relatively high. In a case of a medium-high rotation speed, temperature of the motor is relatively high; in other words, in this case, heat generation power of the motor is relatively high. It may be understood that numbers marked in (a) in FIG. 2 to (f) in FIG. 2 are all examples. In practice, corresponding numbers change based on different motor parameters and different input configurations for the motor. In addition, curves shown in (a) in FIG. 2 to (c) in FIG. 2 and (f) in FIG. 2 show an upper limit of a corresponding working parameter in a driving process of an electric vehicle. The upper limit indicates a value of the corresponding working parameter may be a value of a point on the curve and a point below the curve. For example, as shown in (b) in FIG. 2, in the driving process of the electric vehicle, a value of the torque of the motor and a value of the rotation speed may be a value of any point in a shaded area in the figure. In a process in which a user drives the electric vehicle, the user changes a current in the motor by using an operation of the user (for example, by depressing or releasing an accelerator pedal), to change the torque of the motor, so that a rotation speed of the motor may be changed, to operate the electric vehicle. In the electric vehicle, power is supplied to the motor by using an inverter, and therefore, the current in the motor is changed by adjusting conversion of the current by the inverter; for example, the current of the motor is increased by enabling the inverter to convert a direct current into an alternating current with a larger amplitude, and in addition, heat generation power of the inverter is increased. In other words, a magnitude of the heat generation power of the inverter during operation is directly related to a magnitude of the current in (c) in FIG. 2 or a magnitude of the torque of the motor in (b) in FIG. 2. With the operation of the user, a change of the torque of the motor may jump, may gradually change, may change from small torque to large torque, or may change from large torque to small torque, and a value of the heat generation power of the inverter also changes as the current in the motor or the torque of the motor changes.

Therefore, based on analysis of the foregoing working process, when temperature control is performed on the powertrain, the valve 142 in FIG. 1 may be controlled, to improve temperature control efficiency of the powertrain. When the heat generation power of the inverter is relatively high, the valve 142 is enabled to be in a state 1.0 or an intermediate state close to the state 1.0. In the state 1.0, the valve 142 connects the bypass pipe 141, and disconnects (or partially connects) the water-cooling circuit 14 from the water inlet pipe 143, so that the oil-water heat exchanger 16 is short-circuited by using the bypass pipe 141. When the heat generation power of the inverter is relatively high, the valve is enabled to be in the state 1.0. The water flow in the water-cooling circuit 14 can quickly pass through the bypass pipe 141, so that a water flow rate in the water-cooling circuit 14 is quickly increased, and water temperature is decreased. In this way, heat dissipation efficiency for the inverter is improved. In addition, when the heat generation power of the inverter is relatively high, a rotation speed of the motor is a medium-low rotation speed, and heat generation power is relatively low. In this case, heat of the motor may be dissipated only by using the heat of oil in oil cooling circulation and a heat capacity of the motor. Therefore, in this state, water cooling circulation inside the heat exchanger 16 is temporarily disconnected (or partially disconnected), and a risk of over-temperature of the motor is not caused. Similarly, when the heat generation power of the inverter is relatively low and the heat generation power of the motor and the speed reducer is relatively high, the valve 142 is enabled to be in a state 0.0 or an intermediate state close to the state 0.0. In the state 0.0, the valve 142 disconnects the water-cooling circuit 14 from the bypass pipe 141 and connects the water-cooling circuit 14 to the water inlet pipe 143, so that the water in the water-cooling circuit 14 enters the oil-water heat exchanger 16. The cooling water in the water-cooling circuit exchanges heat with the liquid in the oil-cooling circuit, to decrease temperature of the liquid in the oil-cooling circuit, so that heat dissipation efficiency for the motor and the motor speed reducer is improved. The intermediate state is that both the bypass pipe 141 and the oil-water heat exchanger 16 are in a partially conductive state, and the intermediate state may be represented by a value in a range [0.0, 1.0]. A larger value of the intermediate state indicates a larger degree to which the bypass pipe 141 is close to a fully conductive state, that is, a higher flow proportion of distributed cooling water. For example, an intermediate state 0.8 is a state in which the valve 142 is opened by 80% relative to an opening of the bypass pipe 141, and an intermediate state 0.2 is a state in which the valve 142 is opened by 20% relative to the opening of the bypass pipe 141.

It may be understood that although the foregoing descriptions are provided with reference to FIG. 1 and FIG. 2, the foregoing descriptions are merely examples, but are not limiting. For example, in FIG. 1, the valve 142 is shown as a controllable three-way valve. The valve may be another type of valve, such as a controllable two-way valve, a mechanical two-way valve, or a mechanical three-way valve.

A temperature control system is described in detail by using an embodiment.

Figure 3:
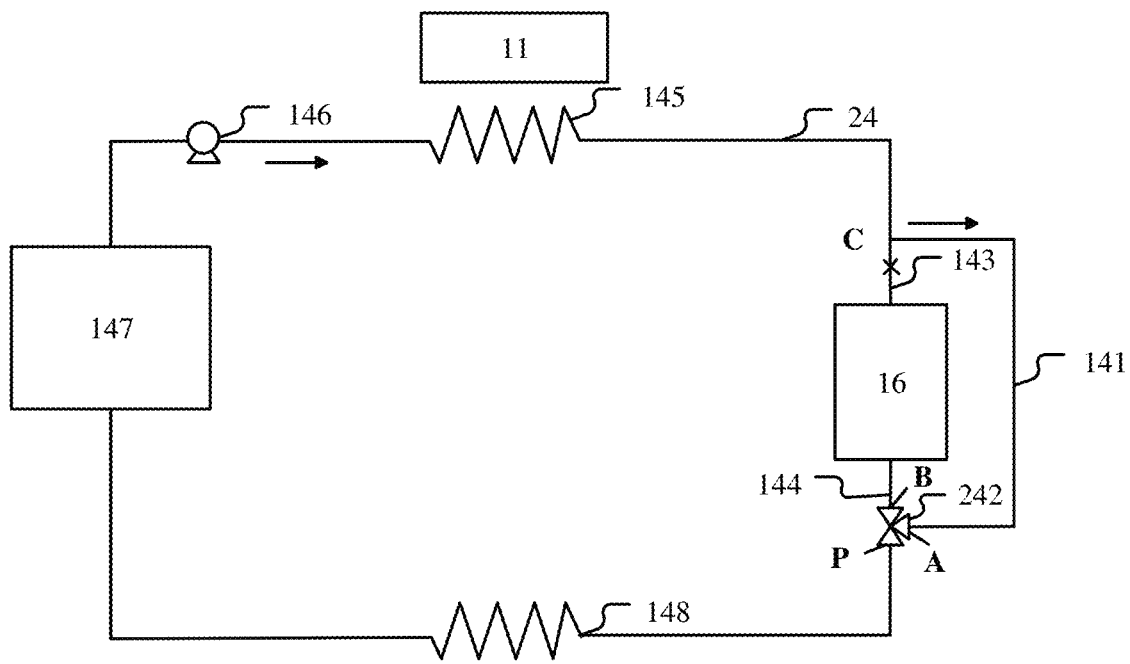
FIG. 3 is a diagram of a flow path of a water-cooling circuit and a schematic diagram of a first state of a valve in the water-cooling circuit according to another embodiment.

FIG. 3 is a diagram of a flow path of a water-cooling circuit 24 and a schematic diagram of a state 1.0 of a valve 242 in the water-cooling circuit 24 according to another embodiment. The water-cooling circuit 24 in FIG. 3 includes the following components that are the same as those in the water-cooling circuit 14 in FIG. 1: an oil-water heat exchanger 16, a water inlet pipe 143 and a water outlet pipe 144 that are connected to the oil-water heat exchanger 16, a bypass pipe 141, a radiator 145 configured to dissipate heat for an inverter 11, a water pump 146, a cooling water tank 147, and a radiator 148.

A difference between the water-cooling circuit 24 in FIG. 3 and the water-cooling circuit 14 in FIG. 1 lies in that the water-cooling circuit 24 includes a valve 242, and the valve 242 includes two water inlets: an inlet A and an inlet B, and one water outlet P. The inlet A is connected to the bypass pipe 141, the inlet B is connected to the water outlet pipe 144, and the outlet P is connected to a section of main pipe in the water-cooling circuit 24. One end that is of the bypass pipe 141 and that is located at a position "C" in the figure is connected to the water inlet pipe 143 and the main pipe of the water-cooling circuit 24, and the other end is connected to the inlet A of the valve 242, to be connected in parallel to the oil-water heat exchanger 16.

Figure 4:
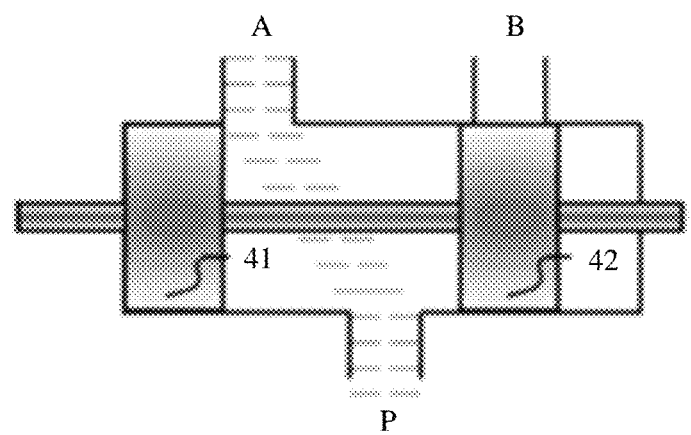
FIG. 4 is a diagram of an internal structure of a valve in a first state.

FIG. 3 shows the state 1.0 of the valve 242, and FIG. 4 shows a diagram of an internal structure of the valve 242 when the valve 242 is in the state 1.0. As shown in FIG. 4, the valve 242 internally includes a piston 41 and a piston 42 that are in a rigid connection. When the valve 242 is in the state 1.0 shown in FIG. 4, positions of the piston 41 and the piston 42 enable the inlet A to be opened and the inlet B to be closed. Therefore, as shown by a solid-line arrow above the bypass pipe 141 in FIG. 3, the valve 242 connects the bypass pipe 141 to the main pipe of the water-cooling circuit 24, and the valve 242 disconnects the water outlet pipe 144 from the main pipe of the water-cooling circuit 24. Therefore, as shown by "x" in FIG. 3, when flowing through a point C, all water flow in the water-cooling circuit passes through the bypass pipe 141 and does not flow into the oil-water heat exchanger 16.

Figure 5:
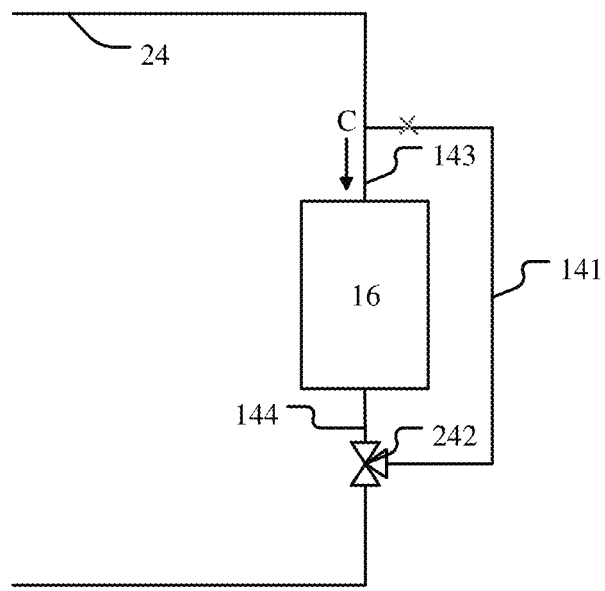
FIG. 5 is a schematic diagram of a second state of the valve in the water-cooling circuit shown in FIG. 3.

FIG. 5 is a schematic diagram of a state 0.0 of the valve 242 in the water-cooling circuit 24 shown in FIG. 3. As shown in FIG. 5, in the state 0.0 of the valve 242, as shown by an arrow in FIG. 5, the valve 242 connects the water outlet pipe 144 to the main pipe of the water-cooling circuit 24. As shown by x in FIG. 5, the valve 242 disconnects the bypass pipe 141 from the main pipe of the water-cooling circuit 24, so that when flowing through a point C, all water flow in the water-cooling circuit flows into the oil-water heat exchanger 16 but does not flow into the bypass pipe 141.

The valve 242 shown in FIG. 3 and FIG. 5 may be a controllable valve, such as an electromagnetic valve, an electric valve, or a hydraulic valve, or the valve 242 may be an uncontrollable valve, such as a mechanical valve. When the valve 242 is an uncontrollable valve, a mechanical valve is preset, so that a state of the valve constantly maintains an intermediate state between 0.0 and 0.1; the valve shown in FIG. 4 may be preset, so that both the inlet A and the inlet B are partially opened, and water flow separately flows into the bypass pipe 141 and the oil-water heat exchanger 16 after passing through the point C. In this way, flow resistance in the entire water-cooling circuit is decreased by using the bypass pipe 141, and a flow rate in the water-cooling circuit is increased, so that heat dissipation efficiency for the inverter 11 is improved.

When the valve 242 is a controllable valve, a state of the valve 242 may be controlled, so that in a process in which heat generation power of the inverter 11 increases or before heat generation power of the inverter 11 increases, a flow percentage of cooling water in the water-cooling circuit 24 that flows into the bypass pipe 141 is increased, and a flow percentage of cooling water that flows into the oil-water heat exchanger 16 is decreased; and after the heat generation power of the inverter decreases, the flow percentage of the cooling water that flows into the bypass pipe 141 is decreased, and the flow percentage of the cooling water that flows into the oil-water heat exchanger 16 is increased. In this way, heat dissipation efficiency of the temperature control system for the powertrain is further optimized.

When the valve 242 is an electromagnetic valve, for example, an initial state of the valve 242 is the state 1.0 shown in FIG. 4, that is, the inlet A is opened, and the inlet B is closed, when windings (not shown) on the pistons in a rigid connection are charged with electricity to exert, on the pistons in a rigid connection, electromagnetic force of pushing the pistons to the right, the pistons in a rigid connection quickly move to the right until the piston 42 reaches a rightmost side, so that the inlet A is closed and the inlet B is opened, that is, the valve 242 is enabled to be in the state 0.0. When power supply for the windings is disconnected, the pistons in a rigid connection resume the state 1.0 shown in FIG. 4. The electromagnetic valve can only be in the state 1.0 or the state 0.0. Therefore, when the valve 242 is an electromagnetic valve, the valve 242 does not have the intermediate state.

When the valve 242 is an electric valve, as shown in FIG. 4, in the valve 242, pistons in a rigid connection may be moved to the left and right at a predetermined speed, and movement of the pistons in a rigid connection may be stopped at any position in a moving process and the pistons in a rigid connection are kept at this position. Therefore, when the valve 242 is an electric valve, initial positions of the pistons in a rigid connection may be any position in space in which the pistons in a rigid connection are moved to the left and right. Through control over the valve, positions of the pistons in a rigid connection in the valve may be changed. For example, the pistons in a rigid connection may be parked at middle positions inside the valve, so that both the inlet A and the inlet B are partially opened. When the valve 242 is an electric valve, similar to the electromagnetic valve, a state of the valve shown in FIG. 4 is the state 1.0, and a state in which the piston 42 is at a rightmost side is the state 0.0. In addition, a state in which the pistons in a rigid connection are located at the middle of the valve 242 so that both the inlet A and the inlet B are partially opened is the intermediate state.

Figure 6:
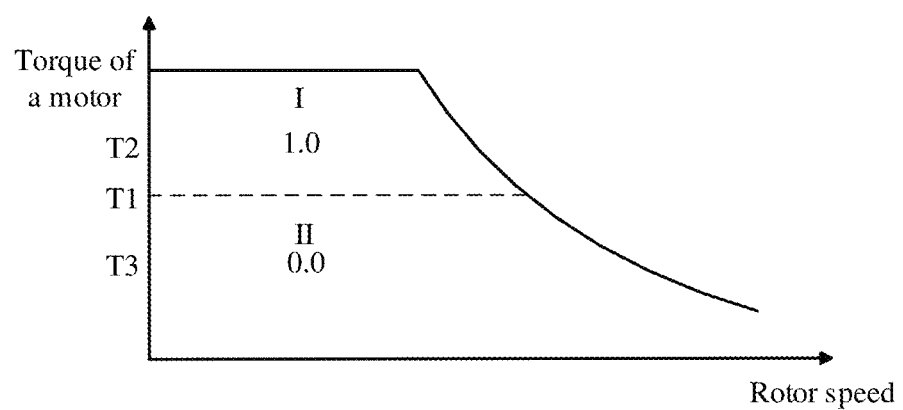
FIG. 6 is a schematic diagram of state control over a valve.

FIG. 6 is a schematic diagram of state control over the valve 242. The state control shown in FIG. 6 can be implemented by using the foregoing electromagnetic three-way valve or electric three-way valve. The control shown in FIG. 6 includes control relative to an operating condition I and an operating condition II. As shown in FIG. 6, the operating condition I includes each point in a plane indicated by "I" in the figure, and the operating condition II includes each point in a plane indicated by "II" in the figure. In the operating condition I, torque of the motor is greater than or equal to T1. It can be understood with reference to (b) in FIG. 2, (d) in FIG. 2, (e) in FIG. 2, and (f) in FIG. 2 that, for each torque value in the operating condition I, heat generation power of the inverter is greater than or equal to a predetermined threshold, and heat generation power of the motor is relatively low. Therefore, in the operating condition I, the valve 242 is controlled to be in the state 1.0, so that cooling water flow flows only into the bypass pipe 141. Because water resistance in the bypass pipe 141 is relatively small, a water flow rate in the water-cooling circuit increases, and heat dissipation efficiency for the inverter is improved.

In the operating condition II, as shown in the figure, torque of the motor is less than T1. It can be understood with reference to (b) in FIG. 2, (d) in FIG. 2, (e) in FIG. 2, and (f) in FIG. 2 that heat generation power of the inverter is less than a predetermined threshold, and heat generation power of the motor is relatively high when a rotation speed is relatively high; in other words, in some cases of the operating condition II, the heat generation power of the motor is relatively high. Therefore, in the operating condition II, the valve 242 is controlled to be in the state 0.0, so that all cooling water flow flows into the oil-water heat exchanger 16 and does not flow into the bypass pipe 141. In this way, heat of the oil-cooling circuit 15 is dissipated by using cooling water flow in the water-cooling circuit 24, so that a heat dissipation capability for the motor is improved. It may be understood that T1 marked in the figure is merely an example, and a value of T1 may be set based on a requirement of a vehicle. Therefore, T1 is not necessarily located at a position shown in the figure. With reference to (a) in FIGS. 2 to (f) in FIG. 2, changes of all working parameters in the powertrain are associated. Therefore, operating conditions may not be limited based on a predetermined torque value and control over the valve may not be limited based on the predetermined torque value. For example, the operating conditions may alternatively be classified based on predetermined values of any one or more of the following: power of the motor, a stator current of the motor, a rotation speed of the motor, heat generation power of the motor, winding temperature of the motor, magnetic steel temperature of the motor, temperature of the inverter, heat generation power of the inverter, and the like. The foregoing parameter values may be directly measured by a sensing unit of the electric vehicle and then transmitted to a controller of the electric vehicle or may be determined through calculation by the controller based on input from the sensing unit, so that the controller may control the valve 242 based on a value of any parameter or respective values of several parameters. For example, with reference to (d) in FIG. 2, the operating conditions may be classified based on values of the winding temperature and the rotation speed, to determine control over the valve.

As described above, in a process in which a user drives the electric vehicle, the heat generation power of the inverter may be changed based on an operation of the user. For example, after the user depresses an accelerator pedal to speed up, the controller in the electric vehicle first determines, based on depressing depth of the user that is sensed and input by a sensor, a change to occur on torque of the motor, to determine a change to occur on the heat generation power of the inverter. For example, based on the depressing depth of the user on the accelerator pedal, it may be determined that the torque of the motor is to change from T3 in FIGS. 6 to T2. Because T2 is in a range of the operating condition I, and T3 is in a range of the operating condition II, the torque of the motor is to increase; in other words, the heat generation power of the inverter is to increase. Therefore, the controller may change the state of the valve 242 from the state 0.0 to the state 1.0 before increasing the torque of the motor or while increasing the torque of the motor (that is, in a process of increasing the torque of the motor, where relatively short time is used in this process, and it may be considered that the process of increasing the torque of the motor and changing the state of the valve 242 from the state 0.0 to the state 1.0 may be performed at a same time), to adapt to an increase in the heat generation power of the inverter caused by an operation action of the user, so that the temperature of the inverter can be decreased by more than 10° C. in a short period of time. After the state of the valve 242 is controlled to be the state 1.0, a rotation speed of the motor increases due to an increase in a current of the motor, and therefore, the heat generation power of the motor increases, and there may be a risk of over-temperature. Therefore, when predetermined duration (for example, dozens of seconds) elapses after the state of the valve 242 is changed to the state 1.0, the electric vehicle needs to actively decrease the current of the motor and decrease the torque of the motor, so that an operating condition of the powertrain changes to the operating condition II again. After the torque of the motor is decreased, the heat generation power of the inverter decreases, and the inverter has no risk of over-temperature, and therefore the controller can resume the state of the valve 242 to the state 0.0.

When the controller in the electric vehicle determines, based on the operation of the user, that the torque of the motor is to be changed from the operating condition I to the operating condition II, the controller first decreases the torque of the motor, so that the operating condition of the powertrain of the electric vehicle correspondingly changes from the operating condition I to the operating condition II. After the torque of the motor is decreased, the heat generation power of the inverter decreases, and there is no risk of over-temperature, so that the controller can change the state of the valve from the state 1.0 to the state 0.0 after decreasing the torque of the motor.

Figure 7:
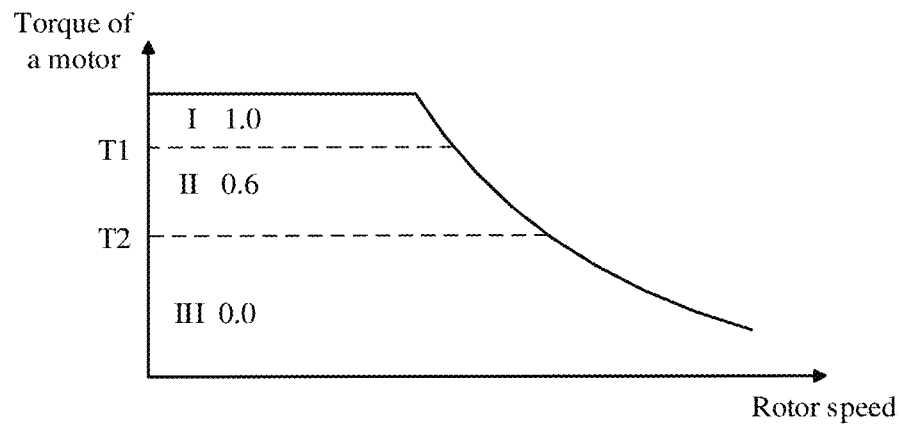
FIG. 7 is a schematic diagram of another state control over a valve.

FIG. 7 is a schematic diagram of another state control over the valve 242. The control shown in FIG. 7 includes control relative to an operating condition I to an operating condition III. In the operating condition I, torque of the motor is greater than or equal to T1. Similarly, with reference to (f) in FIG. 2, heat generation power of the inverter is relatively high. In this case, the controller controls the valve 242 to be in the state 1.0, to improve heat dissipation efficiency for the inverter. In the operating condition II, torque of the motor is less than T1 and greater than or equal to T2, and heat generation power of the inverter decreases compared with that in the operating condition I. Therefore, the controller controls the valve 242 to be a state 0.6, that is, with reference to FIG. 4, the inlet A is opened by approximately 60%, and the inlet B is opened by approximately 40%, so that approximately 60% of fluid flow in the water-cooling circuit 24 flows into the bypass pipe 141, and approximately 40% of fluid flow flows into the oil-water heat exchanger 16. In the operating condition III, torque of the motor is less than T2, and heat generation power of the inverter is relatively low. In a part of a relatively high rotation speed in the operating condition III, heat generation power of the motor is relatively high. Similar to FIG. 6, the controller controls the valve 242 to be in the state 0.0, so that water flow in the water-cooling circuit 24 that flows into the oil-water heat exchanger 16 is increased, to improve a heat dissipation capability for the motor.

Similar to the foregoing control over the valve based on FIG. 6, the controller in the electric vehicle first determines, based on an operation of the user, a change to occur on the torque of the motor, to determine a change to occur on the heat generation power of the inverter. When determining that the torque is to be increased, the controller may change the state of the valve 242 before increasing the torque of the motor or while increasing the torque of the motor, and when determining that the torque is to be decreased, the controller may change the state of the valve 242 after decreasing the torque of the motor. For example, when determining that the torque is to be changed from the operating condition III to the operating condition I, the controller changes the state of the valve 242 from 0.0 to 1.0 before or during the change; when determining that the torque is to be changed from the operating condition III to the operating condition II, the controller changes the state of the valve 242 from 0.0 to 0.6 before or during the change; when determining that the torque is to be changed from the operating condition II to the operating condition I, the controller changes the state of the valve 242 from 0.6 to 1.0 before or during the change; when determining that the torque is to be changed from the operating condition I to the operating condition II, the controller changes the state of the valve 242 from 1.0 to 0.6 after the change; when determining that the torque is to be changed from the operating condition I to the operating condition III, the controller changes the state of the valve 242 from 1.0 to 0.0 after the change; and when determining that the torque is to be changed from the operating condition II to the operating condition III, the controller changes the state of the valve 242 from 0.6 to 0.0 after the change.

Figure 8:
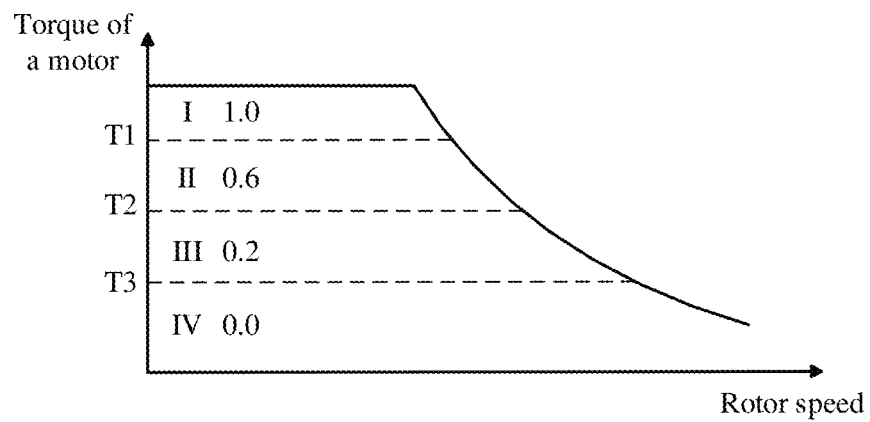
FIG. 8 is a schematic diagram of another state control over a valve.

FIG. 8 is a schematic diagram of another state control over the valve 242. The control shown in FIG. 8 includes control relative to an operating condition I to an operating condition IV. FIG. 8 differs from the control in FIG. 7 in that a total of two operating conditions: an operating condition II and an operating condition III that are respectively corresponding to two intermediate states (0.6 and 0.2) of the valve are included between the operating condition I corresponding to the valve state 1.0 and the operating condition IV corresponding to the valve state 0.0. Therefore, as shown in FIG. 8, in the operating condition II, torque of the motor is between T1 and T2, and heat generation power of the inverter is not much lower than that in the operating condition I. The controller controls the valve 242 to enable the valve 242 to be in a state 0.6, approximately 60% of water flow in the water-cooling circuit 24 may be enabled to flow into the bypass pipe 16, so that heat dissipation efficiency for the inverter is relatively high. In the operating condition III, torque of the motor is between T2 and T3, and heat generation power of the inverter is decreased to a relatively extent than that in the operating condition I. The controller controls the valve 242 to enable the valve 242 to be in a state 0.2, to decrease heat dissipation for the inverter, and increase heat dissipation for the motor. In this way, the controller may perform more refined control over the valve relative to a change of the heat generation power of the inverter. A process in which the controller controls the valve 242 when an operating condition of the powertrain changes is similar to the foregoing control processes based on FIG. 6 and FIG. 7. Details are not described herein again.

Figure 9:
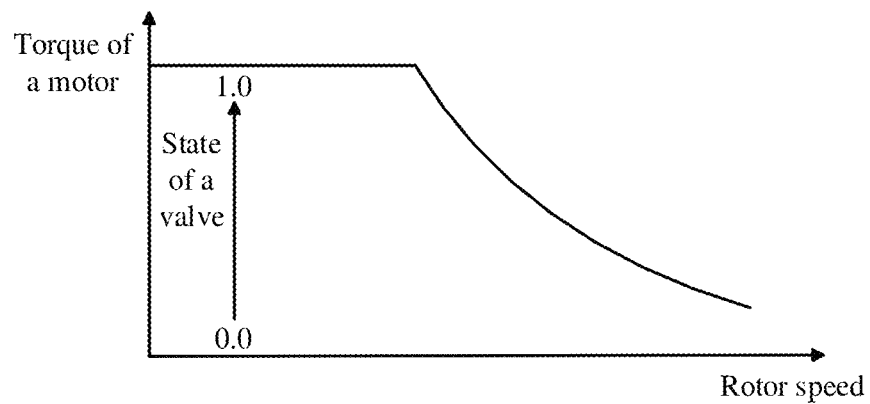
FIG. 9 is a schematic diagram of another state control over a valve.

FIG. 9 is a schematic diagram of another state control over the valve 242. In the control shown in FIG. 9, operating conditions are not classified, but the state of the valve 242 is enabled to change from the state 0.0 to the state 1.0 on average as torque of the motor increases; in other words, a state value of the valve 242 and a value of the torque of the motor is in proportion. Therefore, when determining that the torque of the motor is to change, the controller in the electric vehicle may determine a state value of the valve 242 based on a value to be reached by the torque of the motor, and correspondingly control the state of the valve 242. When the controller determines that the torque of the motor is to be increased, the controller first determines a value that is to be reached by the torque of the motor after the torque of the motor is increased, then determines the state of the valve 242 based on the to-be-reached torque value, and then changes the state of the valve 242 to the foregoing determined state before or while increasing the torque of the motor. When the controller determines that the torque of the motor is to be decreased, the controller first decreases the torque of the motor, then determines the state of the valve 242 based on a value obtained after the torque of the motor is decreased and changes the state of the valve 242 to the determined state.

In the schematic diagrams of state control shown in FIG. 6 to FIG. 9, when the heat generation power of the inverter is relatively high, the valve is enabled to be in the state 1.0, and when the heat generation power of the inverter is relatively low, the valve is enabled to be in the state 0.0. This is not limited thereto in this embodiment. For example, when the valve 242 is a controllable electric valve, the valve 242 may alternatively be controlled by using schematic diagrams of state control shown in FIG. 10 and FIG. 11.

Figure 10:
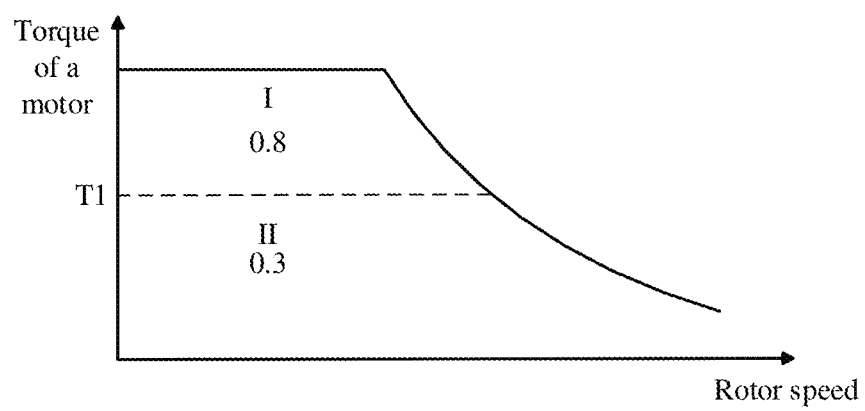
FIG. 10 is a schematic diagram of another state control over a valve.

FIG. 10 is a schematic diagram of another state control over the valve 242. The control shown in FIG. 10 includes valve control separately corresponding to an operating condition I and an operating condition II. In the operating condition I, heat generation power of the inverter is greater than or equal to a predetermined value, and heat generation power of the motor is relatively low. In the operating condition I, the controller controls the valve 242 to be in a state 0.8, so that approximately 80% of cooling water flow flows into the bypass pipe 141. In this way, a flow rate of the cooling water increases, heat dissipation efficiency for the inverter is improved, and approximately 20% of the cooling water flow keeps flowing into the heat exchanger 16, to exchange heat for cooling liquid in the oil-cooling circuit. In the operating condition II, torque of the motor is less than T1, and heat generation power of the inverter is less than a predetermined value. In a part of a relatively high rotation speed in the operating condition II, heat generation power of the motor is relatively high, so that the valve 242 is controlled to be in a state 0.3; approximately 70% of cooling water flow may flow into the oil-water heat exchanger 16, and approximately 30% of the flow flows into the bypass pipe 141. In this way, a heat dissipation capability for the motor is improved.

Figure 11:
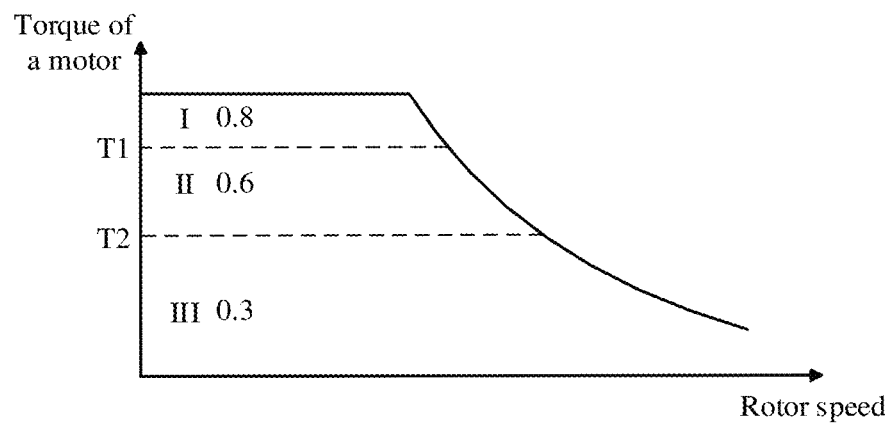
FIG. 11 is a schematic diagram of another state control over a valve.

FIG. 11 is a schematic diagram of another state control over the valve 242. The control shown in FIG. 11 includes valve control separately corresponding to an operating condition I to an operating condition III. In the operating condition I, torque of the motor is greater than or equal to T1, and heat generation power of the inverter is relatively high. In this case, the controller controls the valve 242 to enable the state of the valve 242 to be a state 0.8; approximately 80% of cooling water flow may flow into the bypass pipe 141. In the operating condition II, torque of the motor is between T1 and T2. In this case, heat generation power of the inverter decreases, and the valve 242 is controlled to be in a state 0.6, so that approximately 60% of cooling water flow flows into the bypass pipe 141. In the operating condition III, torque of the motor is less than T2, and the valve 242 is controlled to be in a state 0.3, to further reduce a percentage of flow in the bypass pipe 141 and improve a heat dissipation capability for the motor.

For a process in which the controller controls the valve 242 based on FIG. 10 and FIG. 11 when an operating condition of the powertrain changes, refer to the foregoing descriptions for FIG. 6 and FIG. 7. Details are not described herein again.

Figure 12:
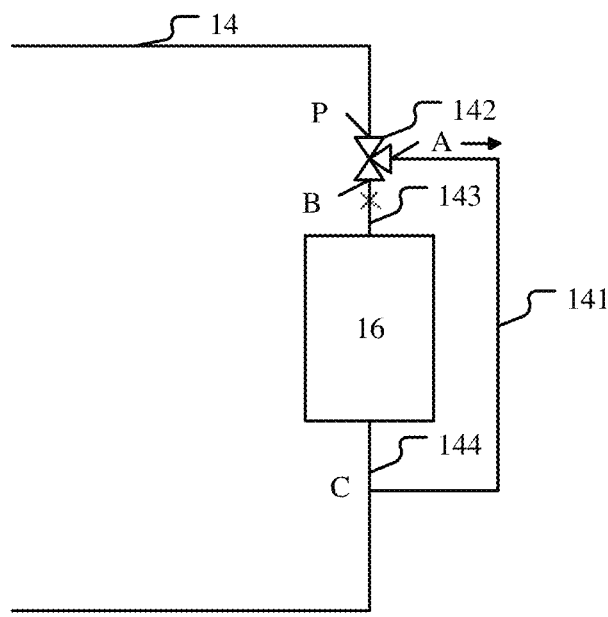
FIG. 12 is a schematic diagram of a first state of a valve in a water-cooling circuit shown in FIG. 1.

FIG. 12 is a schematic diagram of a state 1.0 of the valve 142 in the water-cooling circuit 14 shown in FIG. 1. Different from the valve 242, the valve 142 includes one water inlet (an inlet P) and two water outlets (an outlet A and an outlet B), the inlet P is connected to a main pipe of the water-cooling circuit 14 in FIG. 12, and the outlet A and the outlet B are respectively connected to the bypass pipe 141 and the water inlet pipe 143 of the oil-water heat exchanger 16. The valve 142 may also have an internal structure shown in FIG. 4. Different from the valve 242 in FIG. 3, in this embodiment, the inlet P in FIG. 4 is a water inlet of the valve 142, and the outlet A and the outlet B in FIG. 4 are two water outlets of the valve 142.

In the state 1.0 of the valve 142, as shown by an arrow in FIG. 12, the valve 142 connects the bypass pipe 141 to the main pipe of the water-cooling circuit 14. As shown by an identifier "x" in FIG. 12, the valve 142 disconnects the main pipe of the water-cooling circuit 14 from the water inlet pipe 143, so that when flowing through the valve 142, all water flow in the water-cooling circuit flows into the bypass pipe 141, but does not flow into the oil-water heat exchanger 16, and the water flow that flows into the bypass pipe 141 flows into the main pipe of the water-cooling circuit 14 through a point C in the figure; in other words, in the state 1.0 of the valve 142, the bypass pipe 141 short-circuits the oil-water heat exchanger.

Figure 13:
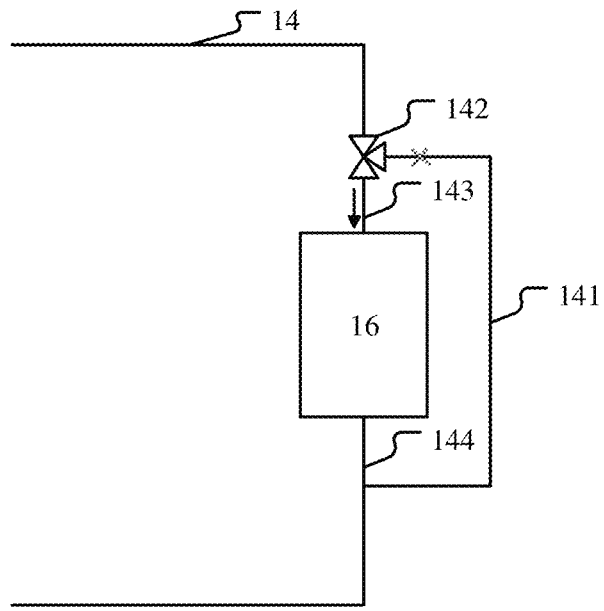
FIG. 13 is a schematic diagram of a second state of a valve in a water-cooling circuit shown in FIG. 1.

FIG. 13 is a schematic diagram of a state 0.0 of the valve 142 in the water-cooling circuit 14 shown in FIG. 1. In the state 0.0 of the valve 142, as shown by an arrow in FIG. 13, the valve 142 connects the water inlet pipe 143 to the main pipe of the water-cooling circuit 14. As shown by an identifier "x" in FIG. 13, the valve 142 disconnects the bypass pipe 141 from the main pipe of the water-cooling circuit 14, so that when flowing through the valve 142, all water flow in the water-cooling circuit 14 flows into the oil-water heat exchanger 16 but does not flow into the bypass pipe 141.

In this embodiment, similar to the embodiment shown in FIG. 3, the valve 142 may be a controllable valve or an uncontrollable valve. When the valve 142 is a controllable valve, the controller may control a state of the valve 142 based on any one of FIG. 6 to FIG. 11, to optimize heat dissipation efficiency for the powertrain. Details are not described herein again.

Figure 14:
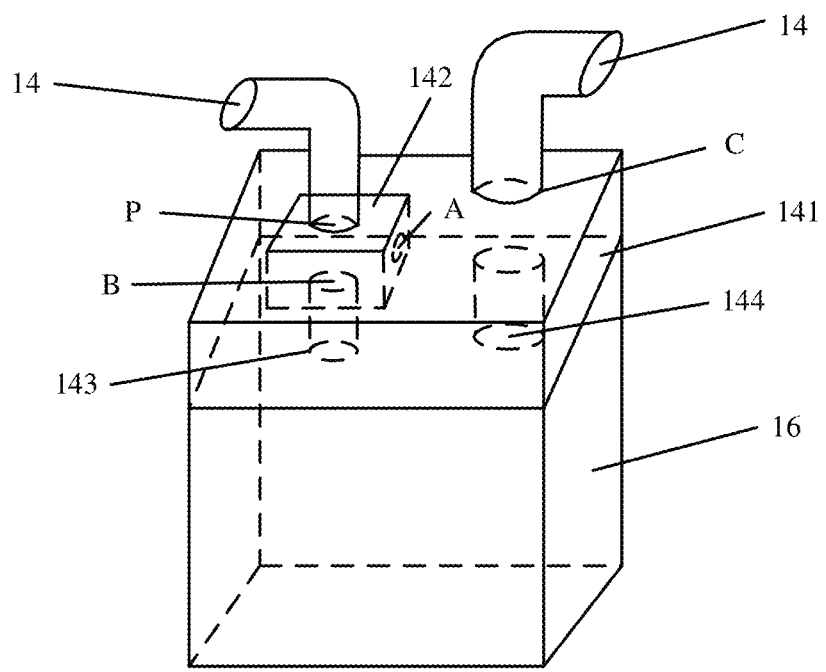
FIG. 14 is a schematic diagram of a box-shaped bypass layer.

It may be understood that, in all the foregoing embodiments, a component used to short-circuit the oil-water heat exchanger 16 is described and shown as the bypass pipe 141. In practice, the component is not limited to a tubular component, but may be made into a component in any shape as required. FIG. 14 is a schematic diagram of a box-shaped bypass layer 141. As shown in FIG. 14, the box-shaped bypass layer 141 is made to adapt to a shape of the oil-water heat exchanger 16, so that the box-shaped bypass layer 141 may be laminated on the oil-water heat exchanger 16. An inner side of the bypass layer 141 includes a hollow inner cavity, and a three-way valve 142 is mounted in the inner cavity. Corresponding to FIG. 12, the three-way valve 142 includes an inlet P used as a water inlet and an outlet A and an inlet B that are used as water outlets. The inlet P is connected to the main pipe of the water-cooling circuit 14, the water outlet A is disposed to face toward the inner cavity of the bypass layer 141, and the water outlet B is connected to the water inlet pipe 143 of the oil-water heat exchanger 16. In addition, the inner cavity of the bypass layer 141 is further connected to the water outlet pipe 144 of the oil-water heat exchanger 16, and is connected to the main pipe of the water-cooling circuit 14 at a position C. In the bypass layer 141, when the valve 142 is in the state 1.0, that is, the outlet A is opened and the outlet B is closed, water flow flowing from the main pipe of the water-cooling circuit 14 into the valve 142 through the inlet P flows into the inner cavity of the bypass layer 141 from the outlet A, and flows back to the main pipe of the water-cooling circuit 14 through the position C. When the valve 142 is in the state 0.0, that is, the outlet B is opened and the outlet A is closed, water flow flowing from the main pipe of the water-cooling circuit 14 into the valve 142 through the inlet P enters the oil-water heat exchanger 16 from the water inlet pipe 143, flows into the inner cavity of the bypass layer 141 from the water outlet pipe 144 of the oil-water heat exchanger 16, and flows back to the main pipe of the water-cooling circuit 14 from the position C. In other words, the bypass layer 141 may achieve a same effect as the bypass pipe 141.

Figure 15:
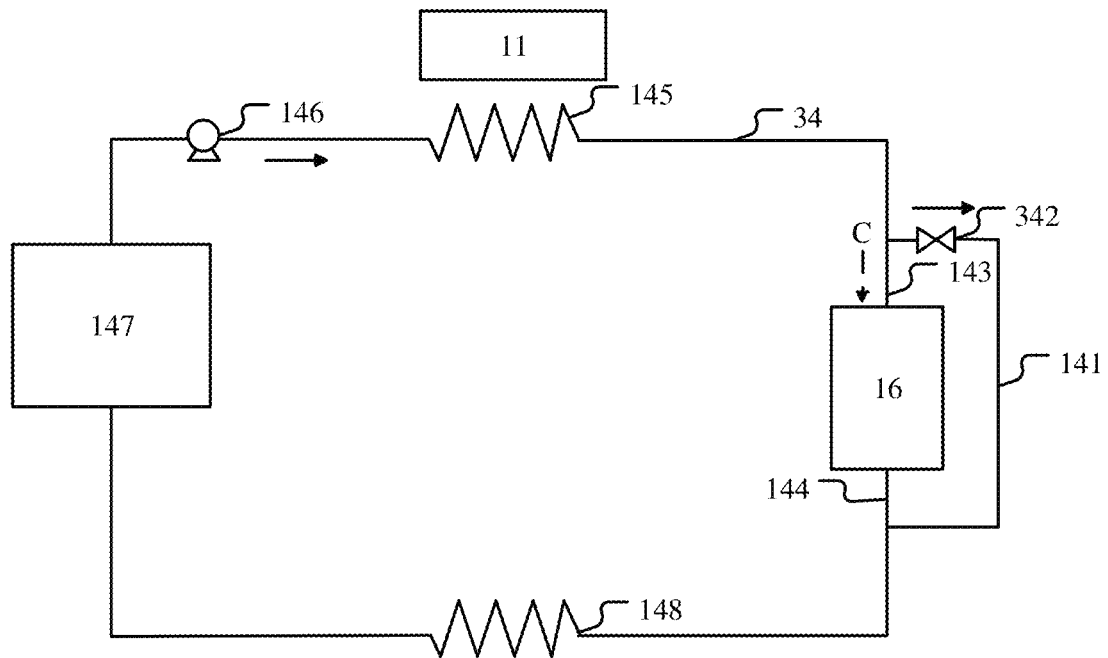
FIG. 15 is a diagram of a flow path of a water-cooling circuit and a schematic diagram of a first state of a valve in the water-cooling circuit according to another embodiment.

FIG. 15 is a diagram of a flow path of a water-cooling circuit 34 and a schematic diagram of a state 1.0 of a valve 342 in the water-cooling circuit 34 according to another embodiment. In this embodiment, similar to the embodiment shown in FIG. 3, the water-cooling circuit 34 also includes a bypass pipe 141, an oil-water heat exchanger 16, a water inlet pipe 143 and a water outlet pipe 144 of the oil-water heat exchanger 16, a radiator 145, a water pump 146, a cooling water tank 147, and a radiator 148. A difference from the embodiment shown in FIG. 3 is that the valve 342 in this embodiment is a two-way valve, and the two-way valve is disposed in the bypass pipe 141, to control connection and disconnection between the bypass pipe 141 and a main pipe of the water-cooling circuit 34. Similar to the foregoing embodiment, the bypass pipe 141 is connected in parallel to the oil-water heat exchanger 16.

As shown in FIG. 15, in the state 1.0 of the valve 342, as shown by a solid-line arrow in the figure, the valve 342 connects the bypass pipe 141 to the main pipe of the water-cooling circuit 34. In this embodiment, as shown by a dashed-line arrow in FIG. 15, in the state 1.0 of the valve 342, the valve 342 cannot disconnect water flow from the main pipe of the water-cooling circuit 34 to the oil-water heat exchanger 16. When water flow in the main pipe of the water-cooling circuit 34 reaches an intersection point C in FIG. 15, whether a part of the water flow is distributed to the oil-water heat exchanger 16 depends on flow resistance in the bypass pipe 141. If the bypass pipe 141 is set to be relatively thick and has extremely small flow resistance, the water flow flowing to the oil-water heat exchanger 16 is approximately zero. If the bypass pipe 141 is set to be relatively thin and has relatively large flow resistance, the water flow separately flows into the bypass pipe 142 and the oil-water heat exchanger 16 at the point C; in other words, at the point C in the water-cooling circuit 34, under the control of the valve 143, the water flow is distributed to two branches: the oil-water heat exchanger 16 and the bypass pipe 142 in a ratio.

Figure 16:
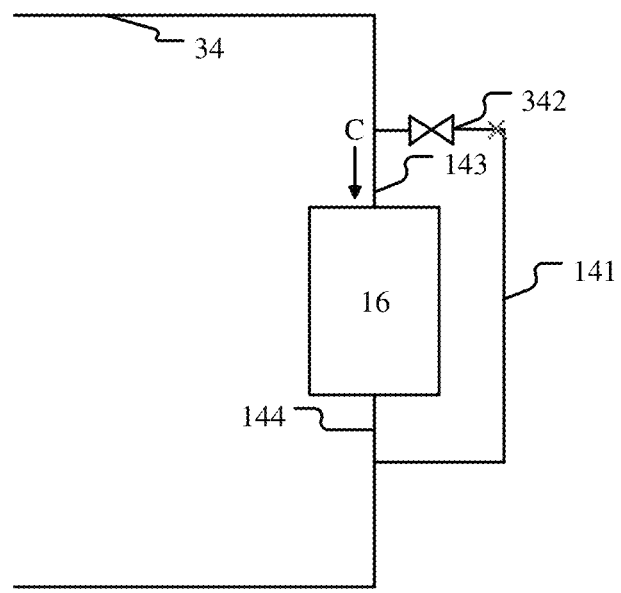
FIG. 16 is a schematic diagram of a second state of the valve in the water-cooling circuit shown in FIG. 15.

FIG. 16 is a schematic diagram of a state 0.0 of the valve 342 in the water-cooling circuit 34 shown in FIG. 15. As shown in FIG. 16, in the state 0.0 of the valve 342, as shown by an identifier "x" in the figure, the valve 342 disconnects the main pipe of the water-cooling circuit 34 from the bypass pipe 141, so that when water flow in the water-cooling circuit 34 flows through a point C in FIG. 16, all the water flow flows into the oil-water heat exchanger 16, but does not flow into the bypass pipe 141.

In this embodiment, similar to the embodiment shown in FIG. 3, the valve 342 may be a controllable valve or an uncontrollable valve. When the valve 342 is a controllable valve, similar to the foregoing descriptions, the controller may control a state of the valve 342 based on any one of FIG. 6 to FIG. 11, to optimize a heat dissipation capability for the powertrain. Details are not described herein again. In this embodiment, an intermediate state of the valve 342 is a state in which an opening of the valve 342 relative to the bypass pipe 142 is partially opened. An intermediate state close to 1.0 is a state in which the opening of the valve 342 is opened to a relatively large degree, and an intermediate state close to 0.0 is a state in which the opening of the valve 342 is opened to a relatively small degree. For example, a state 0.8 may be a state in which the opening of the valve 342 relative to the bypass pipe 142 is opened by approximately 80%, and a state 0.2 may be a state in which the opening of the valve 342 relative to the bypass pipe 142 is opened by approximately 20%.

Figure 17:
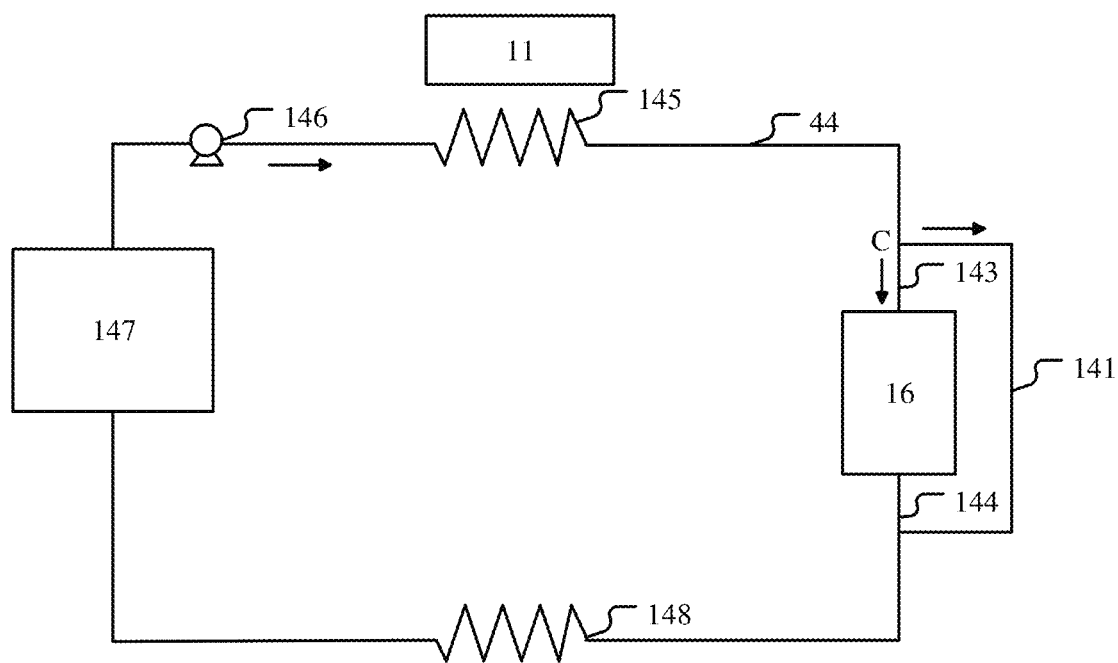
FIG. 17 is a diagram of a flow path of a water-cooling circuit according to another embodiment.

FIG. 17 is a diagram of a flow path of a water-cooling circuit 44 according to another embodiment. As shown in FIG. 17, the water-cooling circuit includes an oil-water heat exchanger 16, a water inlet pipe 143 and a water outlet pipe 144 that are connected to the oil-water heat exchanger 16, a bypass pipe 141, a radiator 145, a water pump 146, a cooling water tank 147, and a radiator 148, and the bypass pipe 141 is connected in parallel to the oil-water heat exchanger 16. Different from the foregoing embodiment, in this embodiment, a valve that is used to control a water flow direction is not included, and the bypass pipe 141 is made to have predetermined flow resistance, so that when water flow in a main pipe of the water-cooling circuit 44 flows to an intersection point C, the flow is distributed to the bypass pipe 141 and the oil-water heat exchanger 16 in a flow ratio. Therefore, compared with a circuit with no bypass pipe 141, flow resistance in the water-cooling circuit 44 is decreased, and a water flow rate in the water-cooling circuit 44 is increased, so that heat dissipation efficiency for the inverter 11 is improved without affecting heat dissipation for the motor. In this embodiment, because the flow resistance in the bypass pipe 141 maintains constant, the water flow in the water-cooling circuit 44 is distributed in a same flow ratio when flowing to the intersection point C. In addition, because the valve does not need to be used in this embodiment, manufacturing costs are relatively low.

Figure 18:
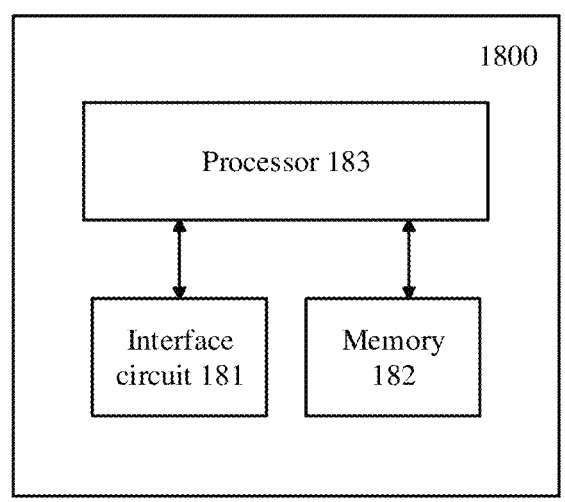
FIG. 18 is a schematic diagram of a chip according to an embodiment.

FIG. 18 is a schematic diagram of a chip 1800 according to an embodiment. The chip 1800 includes an interface circuit 181, a memory 182, and a processor 183.

The interface circuit 181 is coupled to the processor 183.

The memory 182 stores a computer program or instructions, and the processor 183 is configured to run the computer program or the instructions to implement the foregoing control process for the valve in the foregoing temperature control system based on FIG. 6 to FIG. 11, to perform temperature control based on the foregoing temperature control system.

The chip 1800 is, for example, a chip included in a controller in the foregoing electric vehicle.

The interface circuit 181 is configured to receive a sensed value from a sensor in the electric vehicle, to obtain a working parameter value such as a torque value or a current value, and the working parameter value is used as an input parameter for running the computer program or the instructions.

The memory 182 may include a volatile memory, such as a random access memory (RAM); or the memory 182 may be a non-volatile memory, such as a read-only memory (ROM), a flash memory, a hard disk drive (HDD), or a solid-state drive (SSD); or the memory 112 may include a combination of the foregoing types of memories.

The embodiments may further include a vehicle, and the vehicle includes the water-cooling circuit in any one of the foregoing embodiments in a temperature control system used by the vehicle for a powertrain, to have a better heat dissipation effect than that in a conventional technology. It may be understood that, in the foregoing descriptions, although the temperature control system according to embodiments is described by using the electric vehicle as an example, the temperature control system is not limited to the electric vehicle, and may also be used in another vehicle, such as a hybrid electric vehicle. In addition, in the foregoing descriptions, although the temperature control system may include the water-cooling circuit and the oil-cooling circuit, the embodiments are not limited thereto. The temperature control system may include a first cooling circuit and a second cooling circuit. A first cooling medium in the first cooling circuit and a second cooling medium in the second cooling circuit may be determined based on an actual requirement of a vehicle. This is not limited herein.

A person skilled in the art may be further aware that, in combination with the examples described in the embodiments, units and algorithm steps may be implemented by electronic hardware, computer software, or a combination thereof. To clearly describe interchangeability between the hardware and the software, compositions and steps of each example have generally been described in the embodiments based on functions. Whether the functions are performed by hardware or software depends on particular constraints of the solutions. A person skilled in the art may use different methods to implement the described functions for each particular application, but it should not be considered that the implementation goes beyond the scope of the embodiments.

The foregoing descriptions are merely implementations, but are not intended to limit the scope of the embodiments. Any variation or replacement readily figured out by a person skilled in the art shall fall within the scope of the embodiments.

What is claimed is:

1. A temperature control system, comprising:
   a controller;
   a first cooling circuit, wherein a first cooling medium is circulated in the first cooling circuit, and the first cooling circuit is configured to cool an inverter;
   a second cooling circuit, wherein a second cooling medium is circulated in the second cooling circuit, and the second cooling circuit is configured to cool a motor and/or motor speed reducer; and
   a heat exchanger, separately connected to the first cooling circuit and the second cooling circuit, and configured to perform heat exchange between the first cooling medium and the second cooling medium, wherein the first cooling circuit comprises a bypass branch and the bypass branch is connected in parallel to the heat exchanger;

wherein a valve is disposed in the first cooling circuit, and the valve is connected to the bypass branch and is configured to control flow distribution of the first cooling medium that flows from a position corresponding to the inverter to the heat exchanger and the bypass branch; and wherein the inverter is in an electric vehicle, the valve is a controllable valve, and the valve is controlled by the controller and the controller is configured to determine a change that is to occur on heat generation power of the inverter; and when it is determined that the heat generation power of the inverter is to increase, controlling the valve in a process in which the heat generation power of the inverter increases or before the heat generation power of the inverter increases, so that a percentage of flow that is of the first cooling medium and that flows to the bypass branch is increased.

2. The temperature control system according to claim 1, wherein the valve is controlled by the controller and configured to decrease the percentage of the flow that is of the first cooling medium and that flows to the bypass branch after the heat generation power of the inverter decreases.

3. The temperature control system according to claim 1, wherein the valve is controlled by the controller and configured to increase, when the electric vehicle is to reach a first predetermined operating condition, the percentage of the flow that is of the first cooling medium and that flows to the bypass branch to a first percentage.

4. The temperature control system according to claim 3, wherein the valve is controlled by the controller and configured to increase, when the electric vehicle is to reach a second predetermined operating condition, the percentage of the flow that is of the first cooling medium and that flows to the bypass branch to a second percentage, and heat generation power that is of the inverter and that is corresponding to the first predetermined operating condition is greater than heat generation power that is of the inverter and that is corresponding to the second predetermined operating condition, and the first percentage is greater than the second percentage.

5. The temperature control system according to claim 4, wherein the valve is controlled by the controller and configured to decrease, after the electric vehicle reaches a third predetermined operating condition, the percentage of the flow that is of the first cooling medium and that flows to the bypass branch to a third percentage.

6. The temperature control system according to claim 5, wherein the first predetermined operating condition, the second predetermined operating condition, and the third predetermined operating condition are separately determined based on any one or more of the following: torque of the motor, a rotation speed of the motor, power of the motor, heat generation power of the motor, a stator current of the motor, temperature of the inverter, heat generation power of the inverter, and temperature of the motor.

7. The temperature control system according to claim 1, wherein the valve is a two-way valve or a three-way valve.

8. A temperature control method performed based on a temperature control system, the temperature control system comprising:

a first cooling circuit, wherein a first cooling medium is circulated in the first cooling circuit, and the first cooling circuit is configured to cool a first structural unit;

a second cooling circuit, wherein a second cooling medium is circulated in the second cooling circuit, and the second cooling circuit is configured to cool a second structural unit; and a heat exchanger, separately connected to the first cooling circuit and the second cooling circuit, and configured to perform heat exchange between the first cooling medium and the second cooling medium, wherein the first cooling circuit comprises a bypass branch, and the bypass branch is connected in parallel to the heat exchanger; wherein a valve is disposed in the first cooling circuit, and the valve is connected to the bypass branch and is configured to control flow distribution of the first cooling medium that flows from a position corresponding to the first structural unit to the heat exchanger and the bypass branch, wherein the first structural unit is an inverter in an electric vehicle, the valve is a controllable valve, and the valve is controlled to increase, in a process in which heat generation power of the inverter increases or when heat generation power of the inverter is to increase, a percentage of flow that is of the first cooling medium and that flows to the bypass branch, and the temperature control method comprises:

determining a change that is to occur on heat generation power of an inverter; and when it is determined that the heat generation power of the inverter is to increase, controlling a valve in a process in which the heat generation power of the inverter increases or before the heat generation power of the inverter increases, so that a percentage of flow that is of a first cooling medium and that flows to a bypass branch is increased.

9. The temperature control method according to claim 8, further comprising:

when it is determined that the heat generation power of the inverter is to decrease, controlling the valve after the heat generation power of the inverter decreases, to decrease the percentage of the flow that is of the first cooling medium and that flows to the bypass branch.

10. The temperature control method according to claim 9, wherein the controlling the valve in the process in which the heat generation power of the inverter increases or before the heat generation power of the inverter increases, so that the percentage of flow that is of the first cooling medium and that flows to the bypass branch is increased further comprises:

controlling the valve before an electric vehicle reaches a first predetermined operating condition, so that the percentage of the flow that is of the first cooling medium and that flows to the bypass branch is increased to a first percentage.

11. The temperature control method according to claim 10, wherein the controlling the valve in the process in which the heat generation power of the inverter increases or before the heat generation power of the inverter increases, so that the percentage of flow that is of the first cooling medium and that flows to the bypass branch is increased further comprises:

controlling the valve before the electric vehicle reaches a second predetermined operating condition, so that the percentage of the flow that is of the first cooling medium and that flows to the bypass branch is increased to a second percentage, wherein heat generation power that is of the inverter and that is corresponding to the first predetermined operating condition is greater than heat generation power that is of the inverter and that is corresponding to the second predetermined operating condition, and the first percentage is greater than the second percentage.

12. The temperature control method according to claim 11, wherein the controlling the valve after the heat generation power of the inverter decreases, to decrease the percentage of the flow that is of the first cooling medium and that flows to the bypass branch further comprises:
controlling the valve after the electric vehicle reaches a third predetermined operating condition, so that the percentage of the flow that is of the first cooling medium and that flows to the bypass branch is decreased to a third percentage.

13. A vehicle, comprising a temperature control system, wherein the temperature control system comprises:
a controller;
a first cooling circuit, wherein a first cooling medium is circulated in the first cooling circuit, and the first cooling circuit is configured to cool an inverter;
a second cooling circuit, wherein a second cooling medium is circulated in the second cooling circuit, and the second cooling circuit is configured to cool a motor and/or motor speed reducer; and
a heat exchanger, separately connected to the first cooling circuit and the second cooling circuit, and configured to perform heat exchange between the first cooling medium and the second cooling medium, wherein the first cooling circuit comprises a bypass branch, and the bypass branch is connected in parallel to the heat exchanger, the first structural unit is an inverter in the vehicle, and the second structural unit is a motor in the vehicle;
wherein a valve is disposed in the first cooling circuit, and the valve is connected to the bypass branch and is configured to control flow distribution of the first cooling medium that flows from a position corresponding to the inverter to the heat exchanger and the bypass branch; and
wherein a valve is disposed in the first cooling circuit, and the valve is connected to the bypass branch and is configured to control flow distribution of the first cooling medium that flows from a position corresponding to the inverter to the heat exchanger and the bypass branch; and
wherein the inverter is in an electric vehicle, the valve is a controllable valve, and the valve is controlled by the controller and the controller is configured to determine a change that is to occur on heat generation power of the inverter; and
when it is determined that the heat generation power of the inverter is to increase, controlling a valve in a process in which the heat generation power of the inverter increases or before the heat generation power of the inverter increases, so that a percentage of flow that is of the first cooling medium and that flows to the bypass branch is increased.

14. The vehicle according to claim 13, wherein the valve is controlled by the controller and configured to decrease the percentage of the flow that is of the first cooling medium and that flows to the bypass branch after the heat generation power of the inverter decreases.

15. The vehicle according to claim 13, wherein the valve is controlled by the controller and configured to increase, when the electric vehicle is to reach a first predetermined operating condition, the percentage of the flow that is of the first cooling medium and that flows to the bypass branch to a first percentage.

16. The vehicle according to claim 15, wherein the valve is controlled by the controller and configured to increase, when the electric vehicle is to reach a second predetermined operating condition, the percentage of the flow that is of the first cooling medium and that flows to the bypass branch to a second percentage, and heat generation power that is of the inverter and that is corresponding to the first predetermined operating condition is greater than heat generation power that is of the inverter and that is corresponding to the second predetermined operating condition, and the first percentage is greater than the second percentage.

* * * * *